United States Patent
Baker

(10) Patent No.: US 8,377,843 B2
(45) Date of Patent: Feb. 19, 2013

(54) ACTIVATED CARBON FIBERS AND ENGINEERED FORMS FROM RENEWABLE RESOURCES

(75) Inventor: Frederick S. Baker, Oak Ridge, TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 12/763,327

(22) Filed: Apr. 20, 2010

(65) Prior Publication Data

US 2010/0202957 A1   Aug. 12, 2010

Related U.S. Application Data

(62) Division of application No. 11/311,184, filed on Dec. 16, 2005, now Pat. No. 7,727,932.

(51) Int. Cl.
*C01B 31/08* (2006.01)
(52) U.S. Cl. ..................... 502/417; 423/447.2
(58) Field of Classification Search ............... 423/447.2; 502/417
See application file for complete search history.

(56) References Cited

U.S. PATENT DOCUMENTS

| 3,886,093 | A | * | 5/1975 | Dimitri | 502/406 |
| 3,969,268 | A | * | 7/1976 | Fukuda et al. | 502/425 |
| 5,242,879 | A | | 9/1993 | Abe et al. | |
| 6,599,856 | B1 | | 7/2003 | Uchino et al. | |
| 7,232,790 | B2 | | 6/2007 | Tanaka et al. | |
| 7,465,692 | B1 | * | 12/2008 | Brown et al. | 502/417 |

FOREIGN PATENT DOCUMENTS

| JP | 57118376 | 7/1982 |
| JP | 2002038334 | 2/2002 |

* cited by examiner

*Primary Examiner* — Stuart Hendrickson
(74) *Attorney, Agent, or Firm* — Novak Druce Connolly Bove + Quigg LLP

(57) ABSTRACT

A method of producing activated carbon fibers (ACFs) includes the steps of providing a natural carbonaceous precursor fiber material, blending the carbonaceous precursor material with a chemical activation agent to form chemical agent-impregnated precursor fibers, spinning the chemical agent-impregnated precursor material into fibers, and thermally treating the chemical agent-impregnated precursor fibers. The carbonaceous precursor material is both carbonized and activated to form ACFs in a single step. The method produces ACFs exclusive of a step to isolate an intermediate carbon fiber.

8 Claims, No Drawings

ACTIVATED CARBON FIBERS AND ENGINEERED FORMS FROM RENEWABLE RESOURCES

CROSS REFERENCE TO RELATED APPLICATIONS

This application is a divisional application of U.S. application Ser. No. 11/311,184, filed Dec. 16, 2005, the entirety of which is incorporated herein by reference.

STATEMENT REGARDING FEDERALLY SPONSORED RESEARCH OR DEVELOPMENT

The United States Government has rights in this invention pursuant to Contract No. DE-AC05-00OR22725 between the United States Department of Energy and UT-Battelle, LLC.

FIELD OF THE INVENTION

The invention relates to a method of directly producing activated carbon fiber from natural carbonaceous precursor materials using a chemical activation agent and a thermal treatment without the need for a step of isolating an intermediate carbon fiber, and related compositions thereof.

BACKGROUND OF THE INVENTION

Carbon fibers are currently generally produced from carbon precursors comprising non-renewable fossil sources, such as coal, oil, and natural gas, using time-consuming, energy-intensive, and expensive processes. Such carbon fibers are utilized in engineering applications, such as reinforcement of polymer materials and carbon-carbon composites, where properties such as high tensile strength and/or modulus are key prerequisites, notably in aerospace applications of carbon fibers. However, such engineering properties are not required for applications of the activated form of the carbon fibers; indeed, the engineering properties are essentially destroyed during the process of making the activated form of the carbon fibers.

Activated carbon fibers (ACFs) are generally produced from carbon fibers through a high-temperature carbon gasification process which proceeds in an oxidizing atmosphere, such as carbon dioxide or steam. This process burns away carbon to create high surface area and pore volume in the activated form of the fiber, but in the process decreases product yield and thus further enhances production cost. Given that the major part of the cost of producing a carbon fiber for engineering applications is associated with the creation of those engineering properties, the cost of the activated form of the carbon fibers is inflated by the processing steps to create the unnecessary engineering properties, which results in an overall cost of ACFs that is generally too high for all but a few high-value, niche applications. Moreover, because conventional ACF products are produced from conventional carbon fibers through a high-temperature carbon gasification process, the chemical composition of the ACF is dependent on, and therefore limited by, the composition of the original carbon precursor.

Although uncommon, some references disclose production of ACFs from lignin or lignocellulosic materials. JP 2002038334 entitled "Method for producing fine activated carbon fiber and fine activated carbon fiber produced thereby" discloses a method for producing an ACF containing a step to prepare a dissolved or molten polymer material obtained by dissolving or melting a pyranose-ring or lignin-based polymer material, a step to spin the dissolved or molten polymer material and obtain a fiber of the dissolved or molten polymer material having an average fiber diameter of <=3 μm, a step to produce a fine carbonized fiber derived from the pyranose-ring or lignin-based polymer material by the heat-treatment of the fiber and a step to activate the fine carbonized fiber to obtain the ACF. JP 57118376 entitled "Zinc-halogen battery" discloses using various materials, such as cellulose series fiber, acrylic series fiber, lignin series fiber, special pitch of petroleum series, vinylon series fiber, etc. and processing these materials by burning into carbonized fiber, or they are further heat treated at a high temperature to get carbon fiber. This carbon fiber is used as an electrode in a woven fabric, a non woven fabric, or a felt like shape formed under pressure, being cut in desired electrode shapes. The electrode is processed by dipping in concentrated nitric acid or electrolyzing in a halogen aqueous solution, then the surfaces of carbon fiber are activated. The term "activated" is used in the context of surface-treating the carbon fiber fabric formed from the carbon fibers to obtain a suitable electrode material for zinc-halogen batteries; not in the context of producing porous, high surface area ACFs for adsorptive applications. The agent ($HNO_3$) used to "activate" the carbon fiber cannot create the characteristics desired of "activated carbon fibers", nor is it a chemical activation agent that is suitable for producing activated carbon products.

SUMMARY

A method of producing activated carbon fibers (ACFs) comprises the steps of providing a natural carbonaceous precursor fiber material, blending (e.g. co-spinning) the carbonaceous precursor material with a chemical activation agent to form chemical agent-impregnated precursor fibers, spinning the chemical agent-impregnated precursor to produce fibers. The chemical agent-impregnated precursor fibers are then thermally treated to form the ACFs, wherein the carbonaceous precursor fiber material is both carbonized and activated to form ACFs in a single step, whereby the method produces the ACFs exclusive of a step to isolate an intermediate carbon fiber. In one inventive embodiment, the natural carbonaceous precursor material comprises lignin. The chemical activation agent generally comprises phosphoric acid. The thermal treatment step generally utilizes a peak temperature of less than 500° C., such as 400° C. to 500° C.

The method can further comprise the step of heating the chemical agent-impregnated precursor fibers to a plasticizing temperature to plasticize but not thermoset the chemical agent-impregnated precursor fibers before the thermal treatment step. In this embodiment, the carbonaceous precursor material can comprise a lignocellulosic precursor, wherein the plasticizing temperature is in a range from 80 to 200° C.

In another inventive embodiment, at least one heterocyclic material is provided together with the natural carbonaceous precursor material in the providing step, wherein after the thermal treatment step, hetero atoms from the heterocyclic material are incorporated in situ into the molecular structure of the carbon framework of the ACFs. The heterocyclic material can be selected, for example, from the groups consisting of triazines, triazoles, thiazoles, oxazines and polyaromatic hydrocarbons.

In yet another inventive embodiment, a metal or a metal compound is blended with the chemical activation agent before or during the blending step, wherein after the thermal treatment step the metal together with the ACFs form an activated carbon composite having the metal dispersed throughout the structure of the ACFs. The metal can be a catalytic metal selected from the group consisting of Pt, Pd, Ni, Fe, Cr and Ti.

A wide diversity of pore sizes in the ACFs are provided by the invention as compared to current methods which are limited by the process to those generally smaller than 2 nm in width. In one embodiment, the method provides a distribution of pore widths of the ACFs which are predominantly (>50%) one of microporous (predominantly <2 nm) or mesoporous (predominantly 2 to 50 nm). In another embodiment, the method provides a distribution of pore widths of the ACFs which are predominantly macroporous (>50 nm).

Several inventive compositions of matter are described herein. An ACF material has a distribution of pore widths which are predominantly one of microporous, mesoporous or macroporous. The ACF material can be derived from a natural carbonaceous precursor fiber material. In one embodiment, the ACF material comprises an activated carbon composite having at least one metal dispersed throughout the structure of the ACF.

In another embodiment, the ACF material comprises a plurality of hetero atoms incorporated into the molecular structure of the carbon framework comprising the ACE. In this embodiment, the ACF material can provide a distribution of pore widths which are predominantly microporous, mesoporous or macroporous.

DETAILED DESCRIPTION

A method of producing activated carbon fiber (ACF) comprises the steps of providing a natural carbonaceous precursor fiber material, blending (e.g. co-spinning) the carbonaceous precursor material with a chemical activation agent to form chemical agent-impregnated precursor fibers, spinning the chemical agent-impregnated precursor to produce fibers, and thermally treating the chemical agent-impregnated precursor fibers to form ACFs. The co-spinning can comprise melt-, solvent-, electro-, or air-spinning. The carbonaceous precursor fiber material is both carbonized and activated to form ACFs in a single step, wherein the invention produces the ACFs exclusive of the conventionally required step of isolating an intermediate carbon fiber material. As used herein, based on a definition generally accepted in the carbon industry, the phrase "activated carbon fiber" or "ACF" refers to a material that is essentially only carbon, such as >85% mass fraction carbon, in a fiber form, that has been activated to produce a large surface area and pore volume (in the carbon). A related formal definition by the International Committee for Characterization and Terminology of Carbon (ICCTC) is that for "carbon fiber" (the conventional precursor to the activated carbon form) carbon fibers are fibers (filaments, yarns, rowings) consisting of at least 92% (mass fraction) carbon, regularly in non-graphitic stage" (ICCTC, 1987).

Preferred natural carbonaceous precursors according to the invention are lignocellulosic materials, and include wood-based materials such as wood flour and sawdust, lignin, cellulose, and ground fruit pits and nut shells. A preferred precursor for the production of ACFs is lignin, such as that isolated from the pulping of hard or softwoods or of other lignocellulosic materials, such as used for the production of paper and other cellulose products.

Chemical activation agents may include alkali metal hydroxides, carbonates, sulfides, and sulfates; alkaline earth carbonates, chlorides, sulfates, and phosphates; phosphoric acid; polyphosphoric acid; pyrophosphoric acid; zinc chloride; sulfuric acid; and oleum. Preferred among these agents are phosphoric acid and zinc chloride. A most preferred chemical agent is phosphoric acid. Phosphoric acid is a strong dehydrating agent, which facilitates carbonization at low temperature, and a strong flame retardant, which enhances carbon yield. From the standpoint of the commercial production of activated carbon products, phosphoric acid is also far more acceptable than zinc chloride from the standpoints of product quality and environmental impact.

Phosphoric acid serves another purpose in the instance of the invention by acting as an extrusion aid during drawing of the precursor fiber, a feature not typical of other chemical activation agents. The ACF can thus be produced directly from the acid-containing fiber by thermal treatment at much lower temperatures (400-500° C.) than used for conventional thermal activation (about 800-1100° C.), without the need to isolate an intermediate carbon fiber. Energy savings is further enhanced through the much shorter processing times inherent to chemical activation techniques.

The invention thus eliminates the production and isolation of the intermediate carbon fibers, and produces ACFs directly from a carbonaceous material through a process of chemical activation of the precursor material in the form of a fiber. The effective porosity of ACFs produced by conventional thermal activation of carbon fibers is the result of gasification of the carbon at relatively high temperatures (about 800-1100° C.), which results in substantial loss of carbon mass and therefore increased production cost. In contrast, according to the invention, the porosity of chemically-activated carbons generally is created by chemical dehydration/condensation reactions occurring at significantly lower temperatures (typically <500° C.), and with greatly reduced loss of volatile carbon by-products and consequently greater carbon yield.

As noted above, in a preferred embodiment, the chemical agent is phosphoric acid. Phosphoric acid is routinely used as an activation agent for the commercial production of activated carbon materials on a large scale. The carbonaceous precursor material, typically lignocellulosic (e.g., wood), is generally blended with the acid in the desired proportion and the blend subjected to thermal treatment. The resultant acid char is washed with water to remove the acid, and the isolated activated carbon product is dried. A similar sequence of steps can be applied to the production of ACFs according to the invention. For example, lignin could be blended with concentrated phosphoric acid and extruded into fine fibers using, as appropriate, melt-spinning or solution-spinning techniques. The acid-impregnated lignin fibers can pass directly into a furnace for thermal treatment, where the lignin would be both carbonized and activated in either a single piece of equipment or sequentially in separate pieces of equipment. In some respects, this treatment would be analogous to the stage of carbonization of a precursor fiber during the conventional production of carbon fibers. However, the similarity would end there through the invention's elimination of all the time-consuming and costly steps necessary for production of engineering-quality carbon fibers, including the precursor fiber stabilization stage. Furthermore, the carbonized lignin can be directly activated in the same piece of equipment without isolation of the intermediate carbon fiber, and at much lower temperatures compared to those necessary for thermal activation of conventional carbon fibers; e.g., 400-500° C. versus 800-1100° C. used in conventional processes. Because the mechanism of chemical activation does not involve carbon burn-off, per se, to create porosity, the yield of ACF, on a carbon basis, would be substantially higher than that achieved through thermal activation (post-treatment) of conventional carbon fibers.

Significant benefits of the invention include a substantially simplified process involving fewer processing steps. Each unit operation can also be integrated into a continuous production process. This would be in contrast to conventional carbon fiber production, in which batch operations are necessary to accommodate disparate and incompatible times of some processing steps. The invention also provides substantially reduced energy demand, substantially shorter processing time, and lower capital equipment needs/costs. The ACF yield is also enhanced as compared to conventional processes. The invention also results in reduced process emissions, such as elimination of hazardous hydrogen cyanide emissions that are an inherent feature of polyacrylonitrile (PAN)-based carbon fiber production. The fiber precursor is also a more environmentally-friendly and renewable precursor material, such as lignin and wood. Thus the invention can enhance the quality of the environment. Other benefits from the invention include substantially reduced production cost and selling price, resulting in a more attractive bottom line for the ACF manufacturer. In addition, due to the lower cost, the invention will provide increased utilization of ACFs for cost-sensitive applications in which unique properties of ACF could be exploited.

Commercial applications for ACFs according to the invention include those in commercial applications in which rapid adsorption kinetics are required, a notable property of ACFs compared to granular activated carbon products. Such applications include, for example, solvent concentrator wheels employed for the capture of volatile organic carbons (VOCs) in effluent air from, for example, automotive spray booths. The VOC-laden air is passed through the adsorption zone of the rotating wheel, where the VOCs are captured on the ACFs (typically contained in a honeycomb form). The clean air is discharged directly to the atmosphere. As the wheel continues to rotate, it passes through a regeneration zone (about 30 degree of arc of the wheel) in which a much lower volume of hot air is passed through the wheel. The VOCs are desorbed into the hot air, which is passed to an incinerator for destruction of the VOCs. In essence, a large volume of VOC-laden air (low VOC concentration) is reduced to a much smaller volume of VOC-laden air (high VOC concentration), which can be economically incinerated for destruction of the VOCs released from the automotive spraying operations. Upwards of 20-fold reduction in air volume is achieved through this application of ACFs. The adsorbent media in the wheel represents an investment of several hundred thousand dollars, and must be periodically replaced with new media. Reduced ACF cost would be a very attractive feature in this commercially important application.

The ability to tailor the pore size distribution of ACFs produced through the conventional method of thermal activation of carbon fibers is greatly limited by the inherent mechanism of thermal activation (gasification) of carbon in, for example, an atmosphere containing steam and/or carbon dioxide. The ACF so obtained is typically predominantly microporous in nature; with the width of most pores is <2 nm. For many applications, however, it is desirable that the fibers be mesoporous in nature; i.e., pore widths of 2-50 nm. It is inherently difficult, though, to create mesoporosity through the conventional thermal activation of carbon, and then only at the expense of a very considerable degree of carbon burn-off (e.g., 75%) and with the associated loss of carbon yield (increased product cost).

In marked contrast, a high level of control of pore size distribution can be obtained through chemical activation of a carbonaceous material according to the invention, preferably using phosphoric acid. With the present invention, pore sizes are not limited as in the related art, and widths greater than 2 nm can be obtained, including those in the "mesopore" range of 2-50 nm (20-500 Å) in width (IUPAC) and even pores larger than 50 nm in width, such as 50 to 100 nm in width (defined by IUPAC as "macropores"). Porosity is a structural (textural) aspect of ACF, and the ability to vary pore widths in ACF beyond that possible through the prior art processes represents a novel compositional aspect, and one that is exploitable in the commercial use of such ACF.

Through manipulation of process conditions, such as acid/precursor ratio, temperature, and residence time, the pore size distribution of a chemically-activated ACF product according to the invention can be tailored to that desired for a given application. Indeed, the ability to control pore size distribution through chemical activation is such that the ACF product could be predominantly (>50%), or essentially totally (>95%) microporous, predominantly (>50%) or essentially totally (>95%) mesoporous, or even predominantly (>50%) macroporous (pore widths of 50-100 nm). Furthermore, because of the fundamentally different mechanism of chemical activation, such control over pore size distribution in the ACF product is obtained without significant loss of carbon yield, resulting in far more attractive economics of production compared to the conventional production of ACFs through thermal activation techniques.

In addition to the unique ability to tailor pore distribution in the ACF product to that specifically required for a given application, a further significant advantage of the invention is the ability to incorporate other agents into the fiber during the fiber production process to form ACF composites. For example, catalytic metals, such as Pt, Pd, Ni, Fe, Cr, Ti, etc., can be incorporated into the ACF by blending an appropriate metal compound, or the metal alone, with the activation agent (e.g. phosphoric acid) before or during blending of the acid with the carbonaceous precursor. The majority of the catalytic metals will not be chemically bound with the carbon. Many of the applicable metal compounds will dissolve in the acid, thereby helping to facilitate dispersion of the compound (or metal) throughout the carbonaceous precursor. Subsequent chemical activation of the acid-impregnated carbonaceous precursor will result in finely-divided metal species dispersed throughout the ACF structure. Thus, an ACF incorporating a catalyst could be directly produced without the additional processing steps (and cost) required to impregnate a conventional ACF with a catalyst after production of the ACF product.

It will be recognized that the invention is not limited to the production of catalytic materials comprising ACFs alone, but also encompasses the production of other engineered forms of the catalytic carbon material, such as honeycombs, rods, and pellets, which are desirable for practical use of a carbon-catalyst material. Furthermore, through selection of appropriate carbonaceous precursors, e.g., lignin on one hand or cellulose on the other, it is possible to produce ACF products in which the physical and chemical properties of the carbon material itself could be varied. For example, a lignin precursor will yield a carbon structure in which a useful degree of graphitization could be introduced through subsequent high-temperature processing of the ACF (or of other engineered forms); i.e., creation of a more ordered carbon structure than typical for conventional activated carbon products. The enhanced order in the carbon structure could be exploited in applications requiring, for example, carbon materials exhibiting electrical and/or thermal conductivity.

In a similar context, more fundamental changes in the carbon structure itself could be introduced through the chemical activation of a carbonaceous material containing a relatively high proportion of, say, heteroatoms such as N and S, or of a blend of a typical carbonaceous precursor material (e.g., lignin or wood) and another material containing a relatively high proportion of heteroatoms. Examples of classes of materials rich in heteroatoms include triazines, triazoles, thiazoles, oxazines, and polyaromatic hydrocarbons.

Among the benefits that could be obtained through the introduction of, say, nitrogen into the fundamental structure of the carbon is the creation of sites which are inherently catalytically active; e.g., nitrogen species which are generically described as "aromatic" and pyridinic (acridinic). Such catalytically carbon materials are commercially useful for, for example, the reduction of chloramines in water, the presence of which are not only unpleasant with respect to taste and odor but are also toxic to dialysis patients. Chloramine is increasingly used as the disinfectant of choice for municipal water treatment plants, but, unlike chlorine, it is not readily removed from water through treatment with conventional activated carbon products. Catalytic activated carbons must be used, and these are currently produced through the high-temperature treatment of conventional activated carbon products with a nitrogen-containing compound, typically ammonia or urea. Such high-temperature post-treatment of a carbon material to obtain a catalytically-active, activated carbon product is both expensive and results in substantial carbon loss.

Thus, one unique aspect of the invention is the ability to manipulate the elemental composition of the ACF as noted above, notably through the addition of heterocyclic materials such as the triazines, triazoles, thiazoles, oxazines, and polyaromatic hydrocarbons into the carbon precursor. By including heterocyclic materials (for example) with the main carbon precursor, both carbon and hetero atoms from the heterocyclic material will be incorporated into the molecular structure of the carbon framework of the fiber as a result of the chemical activation process, during which the temperature of the carbonaceous precursor/heterocyclic material/acid blend is progressively raised generally to about 400 to 500° C. Incorporation of hetero atoms (e.g. N or S) into the molecular structure of the carbon framework of the fiber can induce particular electronic effects that can be exploited, for example, for catalysis of certain reactions.

Thus, in marked contrast to earlier work, in the present invention the added (e.g. nitrogen) functionality is introduced into the carbon in situ; i.e., with the formation of the molecular structure of the carbon itself during the chemical activation of the carbon precursor and included heterocyclic material. In contrast, the chemical (elemental) composition of conventional activated carbon products, including ACF, is an artifact of the chemical composition of the carbon precursor material. As noted in the background, because conventional ACF products are produced from conventional carbon fibers through a high-temperature carbon gasification process, the chemical composition of the ACF is dependent on and limited by, the composition of the original carbon precursor, which is typically PAN or an isotropic pitch.

Prophetic Example

It should be understood that the Examples described below are provided for illustrative purposes only and do not in any way define or limit the scope of the invention.

The carbonaceous precursor, such as lignin, is blended with concentrated phosphoric acid at the desired ratio of $H_3PO_4$ to precursor, typically expressed on a dry weight basis and from about 0.5:1 to about 3:1. The acid/lignin blend is formed into fine fibers using either conventional extrusion and/or melt-spinning techniques. Depending on the consistency of the acid/lignin blend, solvent spinning may be a suitable alternative technique to produce the fibrous form. The fibers comprising the acid/lignin blend are progressively heated to temperatures that induce both carbonization and activation, typically in a single piece of equipment. The upper temperature during this thermal treatment is typically <500° C., such as 400° C. In the case of $H_3PO_4$ as the chemical activation agent, the charred fibers are then immersed in hot water to hydrolyze the phosphates formed in the process, then washed with a copious quantity of water to remove the acid from the fibers, such as by pulling the fibers through a vessel with a counter-current flow of water or, alternatively, by transporting the fibers on a moving belt through a similar vessel of water. By using a counter-current flow of water, both the hydrolysis and washing steps could be rapidly accomplished in a single vessel. The washed fibers are conveyed to appropriate drying equipment, to yield the finished ACF product. The process is economically carried out by recovering phosphoric acid from the wash water, with appropriate purification, and recycling it to form the initial blend of acid and precursor. Some make-up acid may be required to replace that "lost" during processing.

An alternative process step involves a relatively low-temperature thermal treatment of the acid/precursor blend before extrusion into fibers. That is, the acid/precursor blend would be heated to a temperature at which it became "plastic," but below that at which the blend would essentially "thermoset". For lignocellulosic precursors, an appropriate temperature would be in the range of 80-200° C. During this initial low-temperature treatment, water would be driven from the blend to produce a "plastic" char that could be more readily extruded into fibers, possibly of higher density. Subsequent processing steps would be essentially as described above.

The ACFs so produced could be further processed. Further processing can comprise formation into "engineered" forms, such as monoliths and honeycombs, for use in specific applications where, for example, low pressure drop (high permeability) and fast adsorption kinetics are required. Typical binders for this purpose can be clays and organic resins, such as phenolic, epoxy, and furfuryl resins.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as described in the claims.

The invention claimed is:

1. An activated carbon fiber material having a distribution of pore widths which are predominantly from 2 to 100 nm,
   wherein said activated carbon fiber material comprises an activated carbon composite having at least one metal dispersed throughout the structure of said activated carbon fiber, and
   wherein the at least one metal is selected from the group consisting of Pt, Pd, Ni, Fe, Cr, and Ti.

2. The material of claim 1, wherein said activated carbon fiber material is derived from a natural carbonaceous precursor material.

3. The activated carbon fiber material of claim 1, wherein the pore widths are predominately from 2 nm-50 nm.

4. The activated carbon fiber material of claim 1, wherein the pore widths are predominately from 50 nm-100 nm.

5. The activated carbon fiber material of claim 1, wherein the distribution is >50% mesoporous.

6. The activated carbon fiber material of claim 1, wherein the distribution is >95% mesoporous.

7. The activated carbon fiber material of claim 1, wherein the distribution is >50% macroporous.

8. An activated carbon fiber material having a distribution of pore widths which are predominantly one of microporous, mesoporous or macroporous, the activated carbon fiber material further comprising:
a plurality of hetero atoms incorporated into a molecular structure of the carbon framework comprising said activated carbon fiber, and
at least one metal dispersed throughout the structure of said activated carbon fiber material,
wherein the at least one metal is selected from the group consisting of Pt, Pd, Ni, Fe, Cr, and Ti.

* * * * *